UNITED STATES PATENT OFFICE.

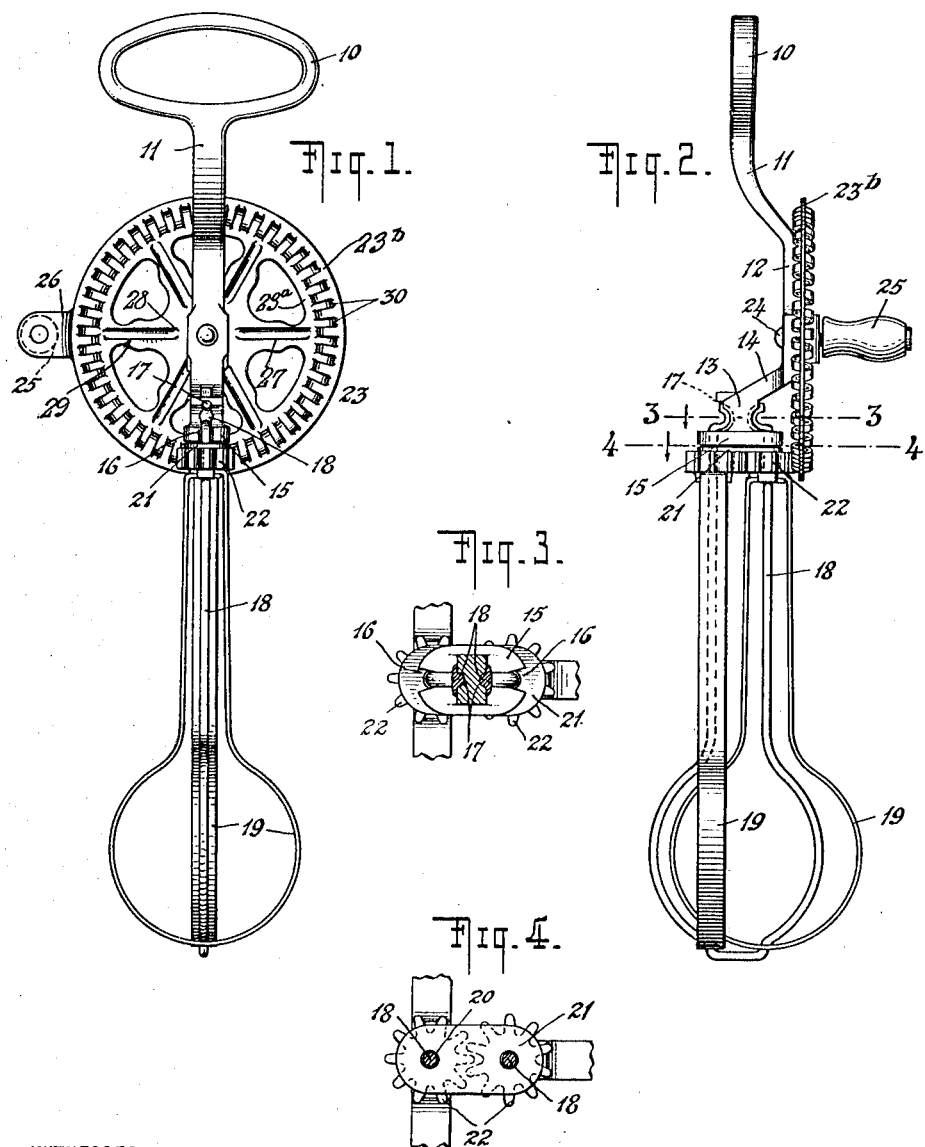

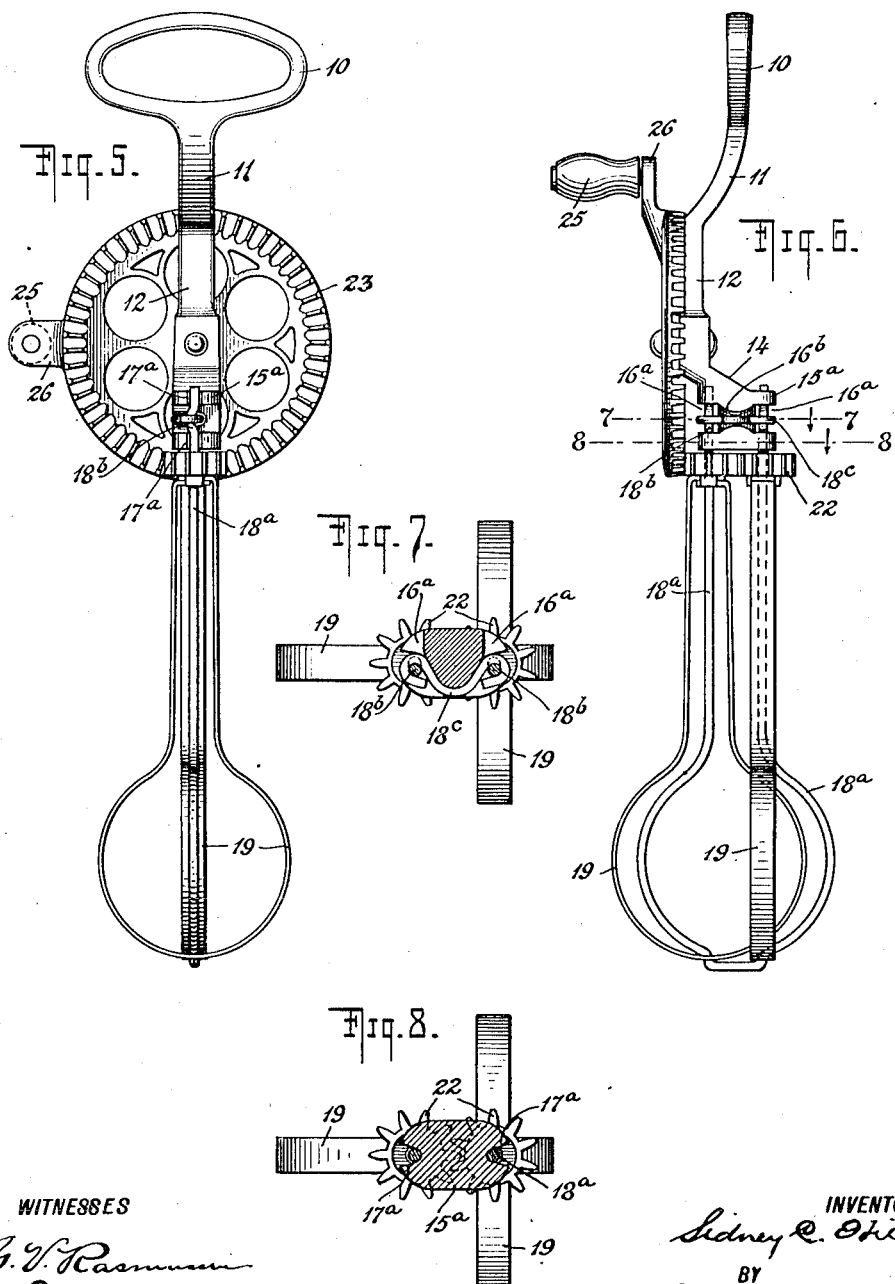

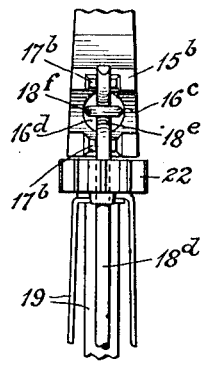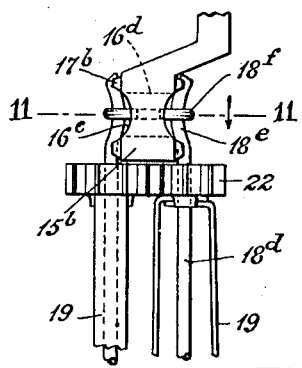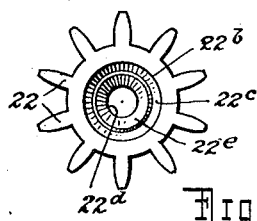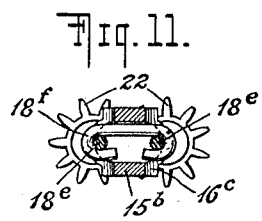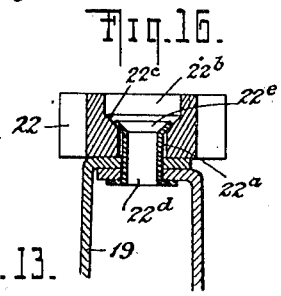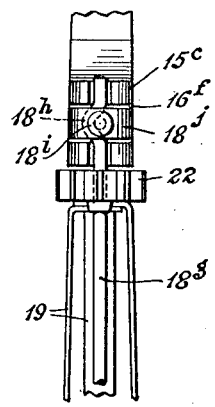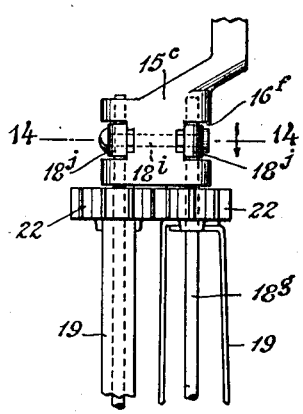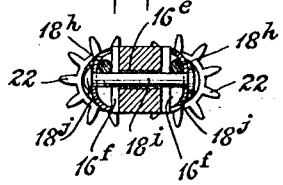

SIDNEY C. HILLS, OF TORRINGTON, CONNECTICUT, ASSIGNOR TO THE TURNER & SEYMOUR MANUFACTURING CO., OF TORRINGTON, CONNECTICUT, A CORPORATION OF CONNECTICUT.

EGG-BEATER.

1,273,486.      Specification of Letters Patent.      Patented July 23, 1918.

Continuation in part of application Serial No. 59,561, filed November 4, 1915. This application filed March 28, 1916. Serial No. 87,156.

*To all whom it may concern:*

Be it known that I, SIDNEY C. HILLS, a citizen of the United States, and resident of Torrington, county of Litchfield, State of Connecticut, have invented certain new and useful Improvements in Egg - Beaters, of which the following is a specification.

My invention relates to devices commonly known as egg beaters and has for its main object to improve and simplify the construction of the type of egg beaters shown for instance in patents to John L. Kirby, No. 406,653, July 9, 1889, and Clarence A. Taplin, No. 725,507, April 14, 1903. A further object of my improvement is to provide an arrangement in which after the handle section is cast or otherwise produced the necessity for drilling holes or the like therein whereby the wires for supporting the beater floats are secured is entirely avoided. My invention further contemplates the provision of a simple and improved means for securing the said wires and handle section together which in part in some cases also serves as an improved bearing for the pinions which operatively connect the beater floats together whereby the life of said pinions and of the general structure is prolonged.

In addition to this my invention proposes to provide an improved mounting for the pinion or pinions which carry the beater floats and whereby the latter are operated and in which the difficulties heretofore present in casting or otherwise forming the axial holes of said pinions in a manner to provide an efficient bearing in coöperation with the customary wires are entirely overcome. My improvement will be fully described hereinafter and the features of novelty will be pointed out in the appended claims. The present application is in part a continuation of another application filed by me in the United States Patent Office on November 4, 1915, Serial No. 59,561.

In the accompanying drawings which illustrate examples of my improved beater, Figure 1 is a front elevation of one form thereof; Fig. 2 is a side elevation; Fig. 3 is a horizontal section on the line 3—3 of Fig. 2; Fig. 4 is a similar view on the line 4—4 of Fig. 2; Fig. 5 is a front elevation of another form of my improvement; Fig. 6 is a side elevation thereof; Fig. 7 is a horizontal section on the line 7—7 of Fig. 6; Fig. 8 is a similar view on the line 8—8 of Fig. 6; Figs. 9 and 10 are detail front and side views respectively of another form of my invention; Fig. 11 is a horizontal section on the line 11—11 of Fig. 10; Figs. 12 and 13 are views similar to Figs. 9 and 10 respectively of still another form of my invention; Fig. 14 is a horizontal section on the line 14—14 of Fig. 13; Fig. 15 is a detail plan view of one of the pinions illustrating my improved mounting therefor; and Fig. 16 is a detail section thereof on the line 16—16 of Fig. 15.

As shown in Figs. 1 to 4 of the drawings my improved beater comprises a handle 10 forming part of a shank 11 having an upright bearing member 12 and terminating in a neck 13 which is preferably formed with opposite inwardly curved surfaces and is connected with the member 12 for instance by means of an inclined member 14 as shown in Fig. 1. The neck 13 forms a continuation of an enlarged head 15, as shown in Figs. 2 and 3, the handle 10, shank 11, member 12, neck 13, member 14 and head 15 being preferably cast as one integral unit. The head 15 is preferably provided with laterally extending open recesses 16 located at opposite ends of said head and continuing lengthwise along inwardly curved surfaces of the neck 13, as indicated at 17, the said recesses thus also having an inward curve. The said recesses 17 with the recesses 16 may be formed when the handle section is cast thus eliminating the necessity for machining the casting in any way or for drilling holes therein after the casting has been completed. The device further includes the usual wires 18 on which the customary beater floats 19 are rotatably supported, the said wires 18 extending through openings 20 in a plate 21 located in surface engagement with the free end face of the head 15. The free ends of the wires 18 also extend through the recesses 16 of the head 15 and are bent inwardly immediately above said head to fit into the recesses 17 in which said ends may be secured in any suitable manner and preferably by crimping them therein. It will be understood that the distance between the openings 20 in the plate 21 is such that the wires 18 will be firmly held at the inner ends of the recesses 16 and 17 against any tendency to spread apart and become disconnected from the handle section. The head 15 forms a rest at the one end of each recess 17 against which the bends of the wires 18 are firmly seated whereby a lengthwise movement of said wires in one direction relatively to the handle section is prevented, the inwardly bent portion of said wires 18 in coöperation with the recesses 17 also preventing a relative movement between the handle sections and the wires 18 in the opposite direction. By crimping said wires in said recesses an additional means for rigidly connecting the wires and handle section together is provided.

Pinions 22 are connected with each beater float and are in operative engagement with each other, said pinions 22 being rotatably mounted on the wires 18 and in the present case engaging the plate 21 which thus forms a bearing for said pinions. This plate 21 is preferably constructed of some metal other than the cast metal of which the handle section and pinions 22 are formed so that by bringing two different kinds of metal into engagement with each other, or in other words by having the pinions 22 of one metal rotate on the plate 21 of another metal, an extremely efficient bearing for said pinions is secured and the life of the latter is materially prolonged. The plate 21, in addition to serving as a means for rigidly maintaining the wires 18 against spreading therefore also provides a bearing surface for the pinions 22 which as a result of this arrangement rotate very easily and with a minimum of friction and a maximum of efficiency.

The means whereby rotary motion is transmitted to the beater floats 19 and the beater is operated comprises a gear 23 journaled at 24 upon the bearing member 12 of the handle section and in the illustrated example shown in Figs. 1 to 4 meshing with one of the pinions 22, actuation of said gear being facilitated by means of a handle 25 preferably carried by a projection 26 extending radially from the gear 23 as shown in Fig. 1. The gear 23 as shown in Figs. 1 and 2 is of special construction and forms an important part of the present improvement, although it is to be understood that, if desired, the specific gear may be replaced by a cast iron or other gear of any well known type and construction as shown by way of example in Figs. 5 and 6. The said gear 23 as illustrated in Figs. 1 and 2 comprises a rim 23$^a$ and spokes or their equivalent 27 connected with a central hub portion 28, the spokes 27, if desired, being provided with ribs 29 extending lengthwise thereof whereby the stiffness and rigidity of the gear is increased. The teeth 30 of said gear 23 are arched or otherwise shaped transversely of the rim 23$^a$ and extend alternately in opposite directions therefrom, it being understood that the entire gear including the teeth 30 and projection 26 is formed by being stamped from a suitable metal blank. The teeth 30 themselves are formed by providing or forming radial slits or cuts in the rim 23$^a$, and located entirely within said rim and then forcing the material between said cuts outwardly preferably in opposite directions alternately. It will be noted that the ends of the stamped out strips which form the teeth 30 remain integrally connected with the rim and thus provide an extremely rigid and strong construction, a peripheral rim 23$^b$ remaining in connection with the outer ends of the strips which form the teeth 30. The transverse arching or equivalent shaping of said teeth also increases the strength of the gear at its periphery where said gear is subjected to the greatest strains and in addition to this by providing alternate teeth which project in opposite directions a symmetrical design is produced which materially enhances the appearance of the gear 23. Such oppositely projecting teeth also make it possible to readily reverse the gear faces so that after one set of teeth has become inoperative the other set may be utilized to operate the pinions 22 thus materially prolonging the usefulness of the entire device and furthermore making it unnecessary to exercise any special care in initially placing the gear in operative position in the beater as either set of teeth is capable of being operatively connected with the pinions.

By constructing the gear 23 as described and by stamping it from a metal blank the weight thereof is reduced to a minimum without sacrificing strength so that the weight of the beater as a whole is materially less than similar devices in which cast metal gears are employed. The said gear 23 may be used in combination with cast iron pinions as shown or with pinions also stamped from metal blanks as may be desired, and as will be readily apparent is not restricted to use in connection with egg beaters but on the contrary is capable of being used in many other types of mechanisms with equal efficiency.

It will be understood that the shape of the spokes 27 as well as the transverse shape of the teeth 30 may be changed to produce gears of a variety of different designs, it being further obvious that in some cases the ribs 29 may be omitted if found unnecessary.

Referring now more particularly to the arrangement shown in Figs. 5 to 8 inclusive the beater as a whole comprises the usual coöperating parts, the novelty in this form residing in the attachment of the customary wires with the handle section and more particularly with the head thereof. As illustrated the head 15$^a$ is provided with recesses 17$^a$ which are located at opposite points of the head 15$^a$ in pairs preferably in vertical registry with each other, the recesses 17ª of each pair being vertically spaced from each other as shown in Fig. 5. Between the recesses 17ª the head 15ª is formed with diametrically opposite indentations 16ª and is further provided on its one face with a horizontal groove 16ᵇ which extends from one indentation 16ª to the other as shown in Fig. 6. The customary wires 18ª corresponding to the wires 18 of Fig. 1 extend through the lower recesses 17ª and have their free ends located in the upper recesses 17ª, those portions of said wires 18ª which lie in the identations 16ª between each pair of recesses 17ª being curved as at 18ᵇ in a direction transverse to the lengthwise direction of the groove 16ᵇ. A connecting link 18ᶜ of wire or other suitable material is located in the groove 16ᵇ and has its opposite ends surrounding the wires 18ª or otherwise connected therewith at the curves 18ᵇ thereof as shown in Figs. 6 and 7. This link 18ᶜ is combined with the wires 18ª so as to exert a tension in the direction of its length tending to draw the curves 18ᵇ of the wires 18ª toward each other, whereby said curves are firmly drawn against the walls of the recesses 17ª and the wires 18ª are thus rigidly and securely connected with the head 15ª. The curves 18ᵇ of the wires 18ª in combination with the shoulders formed by the indentation 16ª prevent the wires from being shifted in the direction of their length under any strain, while the link 18ᶜ owing to the tension which it exerts maintains the ends of said wires firmly seated against any transverse displacement under strain.

As shown in Figs. 9, 10 and 11 the same results are obtained by providing the head 15ᵇ with recesses 17ᵇ corresponding to the recesses 17ª and in this arrangement formed for instance by means of lugs cast integrally with the head 15ᵇ. The latter is also formed with diametrically opposite indentations 16ᶜ corresponding to the indentations 16ª, while the groove 16ᵇ of Figs. 5–8 is replaced by a passage 16ᵈ extending transversely through the head 15ᵇ from one indentation 16ᶜ to the other as shown in Fig. 11. In the construction now being described the wires 18ᵈ also pass through the lower recesses 17ᵇ and have their free ends located in the upper recesses 17ᵇ. Said wires 18ᵈ in this case are also curved as indicated at 18ᵉ, the curves extending inwardly toward the ends of the passage 16ᵈ as shown in Fig. 10. The link 18ᶠ which corresponds in function to the link 18ᶜ and may similarly be constructed of wire or other suitable material extends through the passage 16ᵈ and has its ends bent around or otherwise secured to the wires 18ᵈ at the curves 18ᵉ thereof. This link 18ᶠ is also combined with the wires 18ᵈ so as to exert a tension in the direction of its length tending to always draw the curves 18ᵉ of the wires 18ᵈ toward each other. The operation and results are the same as in the form shown in Figs. 5 to 8 inclusive.

In the form shown in Figs. 12 to 14 inclusive the head 15ᶜ represents a combination of the features of the heads 15ª and 15ᵇ the groove 16ᵇ being replaced by a passage 16ᵉ extending transversely through the head 15ᶜ similar to the passage 16ᵈ of Figs. 9, 10 and 11. The intermediate indentations 16ᶠ also represent a combination of the identations 16ª and 16ᶜ of the forms previously described. In the form now being described the wires 18ᵍ are curved at 18ʰ, and the curve portions lying in the indentations 16ᶠ and extending in a direction transverse to the axis of the passage 16ᵉ. The said curved portions 18ʰ extend about a link 18ⁱ which in this case is in the form of a rod projecting through the passage 16ᵉ and has its opposite ends secured to curved members 18ʲ which engage the wires 18ᵍ on the outside and have their ends in contact with the head 15ᶜ in the identations 16ᶠ thereof. In this form also the link 18ⁱ and members 18ʲ are combined with the wires 18ᵍ so as to exert a tension thereon in the direction of the length of the link 18ⁱ whereby said wires are firmly combined with the head in the same manner and with the same results as in the two forms previously described.

It will be seen in all of the three forms last described that the wires are secured under a tension which owing to the arrangements and constructions may be said to be somewhat resilient so that said wires are firmly and securely held against disconnection partly or completely from the head under all conditions. This is in contradistinction to existing arrangements in which the wires at their free end portions engage and rest against a solid portion of the head and are simply clamped against the same by means of a clamping member. In the present arrangement it will be noted that certain parts of the end portions of the wires do not rest against any part of the head and are thus capable of being at all times under a tension exerted by the connecting link which is itself under tension. An extremely rigid construction is thus secured in which looseness between the head and wires is avoided under all conditions and in which the parts yield under certain strains to prevent the elements of the construction from becoming loose during use.

In Figs. 15 and 16 I have illustrated an improved mounting for the pinions 22. In egg-beaters as now manufactured eyelets or sleeves are used to fasten the floats 19 and the pinions 22 together in such a manner that a rotation of the pinions will cause a corresponding actuation of the floats in the well known manner. As constructed at present it is necessary to have the diameter of the axial opening of the pinion in which the eyelet or sleeve is located correspond as near as possible to the outer diameter of the latter. This is absolutely essential for the reason that with an axial opening of relatively greater diameter than said eyelet or sleeve the latter, in assembling the parts, may occupy a position in which the longitudinal axis of the eyelet or sleeve is eccentric to the axis of the pinion. As the axis of the eyelet or sleeve becomes the axis of rotation when the beater is in use, it will readily be seen that such arrangement causes an eccentric rotative movement of the pinion and thus materially reduces the efficiency of such devices. As the pinions referred to are practically always cast, great difficulty is always experienced by the foundry to keep the axial opening of such pinions the right size for the eyelet or sleeve. In addition to this, the opening owing to its size, easily becomes filled up during casting thus making assembling with the eyelet a difficult and troublesome operation. These objections and difficulties are overcome with my improvement in which the pinion 22 is provided with an axial opening $22^a$, a relatively larger counter bore or recess $22^b$ in axial alinement therewith and with a tapering or inclined surface $22^c$ extending between the opening $22^a$ and the counter-bore or recess $22^b$. The eyelet or sleeve $22^d$ extends into and through the opening $22^a$ and at its lower end is connected with the beater floats 19 in any desired and well known way to prevent relative rotation between said pinion 22 and said float 19. At its opposite or upper end the eyelet or sleeve $22^d$ is formed with an outwardly extending inclined flange $22^e$ having an angle of inclination approximately the same as that of the surface $22^c$, the said flange $22^e$ in the assembled condition of the parts resting upon said surface $22^c$. This is in contradistinction to existing arrangements in which the corresponding surface of the pinion at the bottom of the counter-bore and the corresponding flange of the eyelet or sleeve extend at right angles to the axes of the pinion and eyelet respectively. With the present arrangement the coöperation of the surface $22^c$ and flange $22^e$ is such that the eyelet or sleeve $22^d$ is always properly centered in the opening $22^a$ so that the axis of the said eyelet or sleeve $22^d$ always coincides with the axis of the pinion 22. The action of said surface $22^c$ and flange $22^e$ also serves to maintain this relation between the parts mentioned and prevents the eyelet or sleeve $22^d$ from becoming eccentrically connected with said pinion 22. The usual wires 18 pass through the eyelets $22^d$ and form a bearing therefor in the customary manner so that it will be apparent that an even and efficient operation of the pinions 22 will result from the present arrangement. In addition to this the axial opening $22^a$ need not fit the eyelet $22^d$ snugly and may thus be made large enough to obviate all the difficulties which at present are encountered in the casting operation. Furthermore the tapering or inclined surface $22^c$ also does away with the square shoulder hereinbefore referred to as present in existing constructions at the bottom of the counterbore of such pinions and thus reduces the difficulty of clearing the castings during rolling.

My improved beater may be used and operated in the well known manner and is extremely rigid and simple in construction and of minimum dead weight. The connection of the wires with the handle section as before stated is also extremely rigid whereby distortion of the device and any dislocation of said wires which might, for instance, bring about a disconnection of the pinions 22 is prevented.

It will be understood that the special gear shown in Figs. 1 to 4 inclusive may be combined with the arrangements shown in the remaining figures or that the ordinary gear shown in Figs. 5 and 6 may be utilized as desired.

Various changes in the specific form shown and described may be made within the scope of the claims without departing from the spirit of my invention.

I claim:

1. An egg beater comprising a handle section, beater floats operatively connected together, supporting wires for said floats, and means for connecting said wires with said handle section, said means exerting a tension on said wires at intermediate points and in a direction transverse to said handle section.

2. An egg beater comprising a handle section having oppositely located indentations, beater floats operatively connected together, supporting wires for said floats having their end portions bridging said indentations and means connected with said wires in registry with said indentations for securing said wires and handle section together, said means exerting a tension tending to draw said wires into said indentations.

3. An egg beater comprising a handle section having oppositely located indentations, beater floats operatively connected together, supporting wires for said floats bridging said indentations and having curved portions located in registry therewith and means connected with said wires in registry with said indentations for securing said wires and handle section together, said means exerting a tension tending to draw said curved portions into said indentations.

4. An egg beater comprising a handle section having oppositely located recesses spaced in a vertical direction and indentations located between said recesses, beater floats operatively connected together, supporting wires for said floats having their end portions located in said recesses and bridging said indentations and a link connecting said wires with said handle section, said link exerting a tension tending to draw said wires into said indentations.

5. An egg beater comprising a handle section having a passage extending transversely therethrough, beater floats operatively connected together, supporting wires for said floats bridging the ends of said passage and means extending through said passage and connected with said wires whereby the latter are connected with said handle section.

6. An egg beater comprising a handle section having oppositely located recesses spaced in a vertical direction and indentations located between said recesses, said handle section being further provided with a passage extending transversely therethrough between said indentations, beater floats operatively connected together, supporting wires for said floats having the end portions located in said recesses and bridging said indentations and means extending through said passage and connected with said wires whereby the latter are connected with said handle section.

7. An egg beater comprising a handle section having oppositely located recesses spaced in a vertical direction and indentations located between said recesses, said handle section being further provided with a passage extending transversely therethrough between said indentations, beater floats operatively connected together, supporting wires for said floats having curved end portions located in said recesses and bridging said indentations and a link extending through said passages and connected with the curved portions of said wires, whereby the latter are connected with said handle section, said link exerting a tension tending to draw said wires into said indentations.

In testimony whereof, I have hereunto set my hand.

SIDNEY C. HILLS.